Oct. 17, 1950     E. BODMER     2,525,856
AUTOMATIC LATHE TURRET CONTROLLER Filed June 18, 1945     5 Sheets-Sheet 1

INVENTOR
ERNEST BODMER,
BY 
ATTORNEY

Oct. 17, 1950     E. BODMER     2,525,856
AUTOMATIC LATHE TURRET CONTROLLER Filed June 18, 1945     5 Sheets-Sheet 4

Inventor

Ernest Bodmer

Oct. 17, 1950            E. BODMER            2,525,856

AUTOMATIC LATHE TURRET CONTROLLER

Filed June 18, 1945            5 Sheets-Sheet 5

Fig.4

Inventor

Ernest Bodmer

Patented Oct. 17, 1950

2,525,856

UNITED STATES PATENT OFFICE 2,525,856

AUTOMATIC LATHE TURRET CONTROLLER

Ernest Bodmer, Grand-Lancy-Geneva, Switzerland, assignor to Tarex S. A., Geneva, Switzerland, a corporation of Switzerland Application June 18, 1945, Serial No. 600,112
In Switzerland August 21, 1944

3 Claims. (Cl. 29—41)

In known automatic lathes, the control of the different members is in general effected by a main camshaft. This shaft rotates continually at a constant speed, the whole time that the lathe is in use. For each new series of different pieces to be machined, it is necessary to calculate new cams and to change the cams of the lathe. This changing of cams evidently necessitates a prolonged stop of the lathe, so that this kind of lathe can only be used for machining pieces in very big batches.

In order to improve this state of affairs, certain designers have attempted to mount on the camshaft cams with an adjustable active angular length. These lathes allow "families of pieces" to be manufactured, that is to say pieces having the same profile but with different diameters or lengths, without having to change the cams. Nevertheless, this advantage is to some extent counteracted by the fact that the path of the toolholders must be such as to be sufficient to allow the largest pieces of the "family of pieces" to be machined, so that when machining pieces of small dimensions, the idle paths may become of considerable length. From this it follows that the time required to machine the smallest piece of the "family of pieces" may become absolutely prohibitive.

Other designers have equipped their lathe with universal cams or with drum cams carrying a graduated scale, allowing the active angular length of their profile to be chosen and fixed. It is evident that these cams allow very quick adjustment of the lathes for the execution of an extensive set of pieces requiring sensibly different machining. Nevertheless these cams have the same drawback as all cams with adjustable active length, i. e. a prohibitive increase in the length of the idle paths when small pieces are machined. In addition, these cams can only have simple profiles, that is to say uniformly progressing and causing the tool to advance at a constant speed. It is evident that in many cases the desired operation requires more complicated movements of the tool and that these cams must be replaced by cams with profiles specially calculated to suit the machining which has to be effected.

It has also been found possible to improve the efficiency of automatic lathes a little by mounting special cams (cams with adjustable profile, universal cams, etc.), on auxiliary camshafts rotated from the main camshaft by means of a speed regulator, in such a way as to allow the speed of these auxiliary shafts to be accelerated during control of the idle paths and thus to reduce the total time for a cycle of operations. Nevertheless the idle times still remain considerable for the smallest pieces, of a "family of pieces" and the universal cams only allow simple pieces to be machined.

Finally, automatic lathes have been equipped with devices of variable ratio of transmission fitted in the train of members connecting a cam to the member which it controls. In this way the idle times can be still further reduced, but the principal inconveniences mentioned above remain in their entirety.

Automatic lathes having lead screws to control certain of their members, possess the same drawbacks as those cited above.

In addition, all the known automatic lathes are very complicated and difficult to adjust, for the movements of the slides and of the rotating member are conjugate and ought to be effected simultaneously. This requires dividing the cycles of the machining operations necessary for the manufacture of a piece into several phases of simultaneous operations. In practice, only an expert, absolutely specialising in this matter and specially instructed, is capable of adjusting an automatic lathe. It is evident that it is practically impossible to group the operations in such a way that for each operation of the same phase of operations the same time would be required. It follows that partial idle times exist, i. e. times during which only a part of the tools coming into action during the same phase of operations is effectively in action. Further, it is often very difficult to group the different machining operations into phases of operations, for it is necessary to take account of:

(1) The possible sequence of operations;

(2) The force required by each of the operations;

(3) The effective time necessary for each individual operation;

(4) The possibilities of mounting the tools;

(5) The possibility of effecting several machining operations simultaneously without the toolholders interfering with each other in spite of the idle paths being sometimes considerable.

All the cams of an automatic lathe of the type employing cams which are necessary for machining a given piece constitute a set of cams. Each cam of this set must be specially calculated according to the train of operations arranged, the stroke of the tools, the speed of their feed per revolution of the spindle, and the admissible cutting speed. Such a set of cams consequently needs very profound study by a qualified person.

This study may require a considerable time. In addition, the making of the cams is a difficult and delicate matter and needs special machine tools, for the machining of the slopes must be very precise and carefully done if it is desired to obtain displacement at constant or evenly progressive speed of the tool, avoiding all jerky movements.

Nevertheless, the most serious of the drawbacks possessed by lathes with cams consists in the fact that if it is found during the tests of a set of cams that one of the speeds of feed of one of the tools, or that one of the cutting speeds is too high, the whole set of cams must be rejected, and the study and manufacture of a new set of cams must be taken up again right from the start. But the calculation and manufacture of a set of cams require several days, entailing a cessation of work of equal duration for the lathe, and thus a considerable loss of time.

One object of the present invention is a method of controlling the members of an automatic lathe comprising at least one turret whose toolholder slides are actuated successively by a control member, and of lateral and radial toolholders, each slide of which is actuated by an individual control member. This method tends to eliminate the cited drawbacks and is distinguished from known methods by the fact that the said slides are actuated by actuating members set individually in motion by a control member, at least $n-1$ of these $n$ organs of control being joined individually to a source of energy by an individual connecting member, each of these connecting members being set into its active position by orders issued at desired moments by a central distributor, and by the fact that the setting into active position of a connecting member is subject at least to the position occupied by the slide actuated by the control member set in action by the connecting member in question, in such a way as to prevent the setting into active position of the said connecting member, as long as the necessary conditions are not satisfied.

Another object of the present invention is an automatic lathe for applying the above mentioned method and comprising at least one turret whose toolholder slides are actuated successively by one and the same control member, and lateral and radial toolholders, each slide of which is actuated by an individual control member. This lathe tends to eliminate the cited drawbacks by the fact that the control members are connected to the slides by means of actuating members and that at least $n-1$ of these $n$ control members are joined to a source of energy by an individual connecting member and by the fact that it comprises a distributor issuing orders causing the individual setting into active position of each connecting member at the desired moments, interlocking devices being provided to prevent the setting into the active position of a connecting member at least as long as the toolholder slide displaced by the control member set in action by the said connecting member is outside its initial position.

The accompanying drawings illustrate, by way of example and partly diagrammatically, the arrangements of two forms of execution of a lathe for applying the method of this invention.

In the figures, the different members of the lathe are shown diagrammatically. These figures are solely intended to show the connections between the control members and the source of energy and the various control devices of the connecting members, as well as the various interlocking and safety devices necessary for the good working of the lathe according to the invention.

Figure 1:
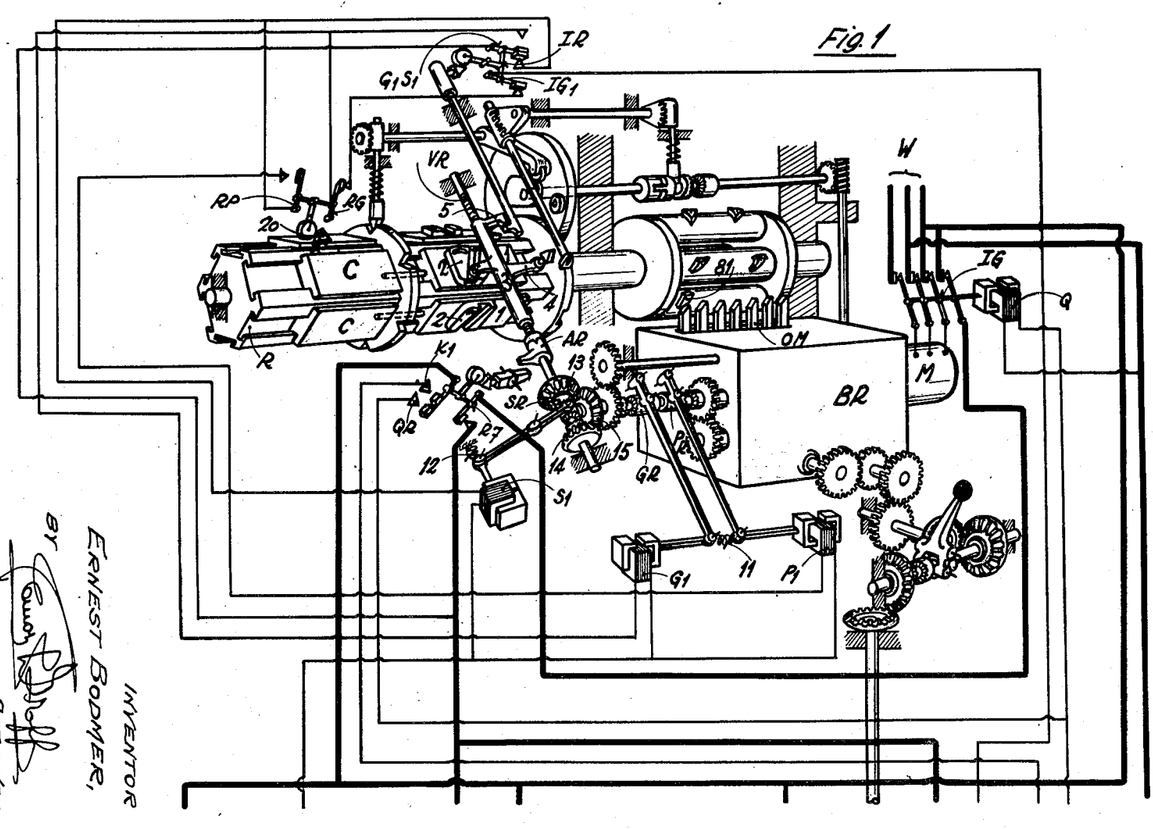
Figs. 1, 1A and 1B are complementary views showing, diagrammatically, a part of the scheme of the arrangement of the electro-mechanical connections in a first form of execution.
Figure 1A:
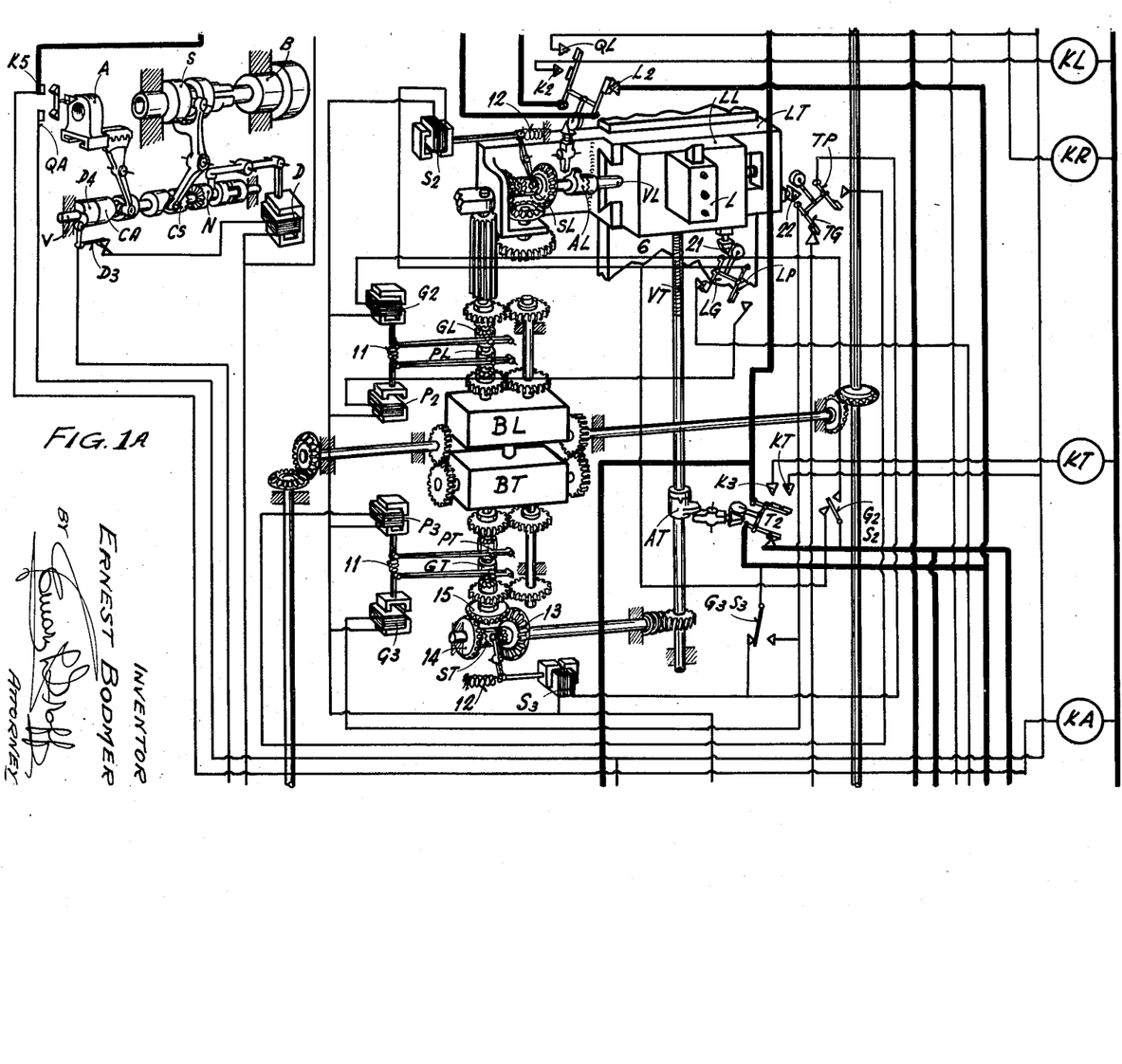
Figure 1B:
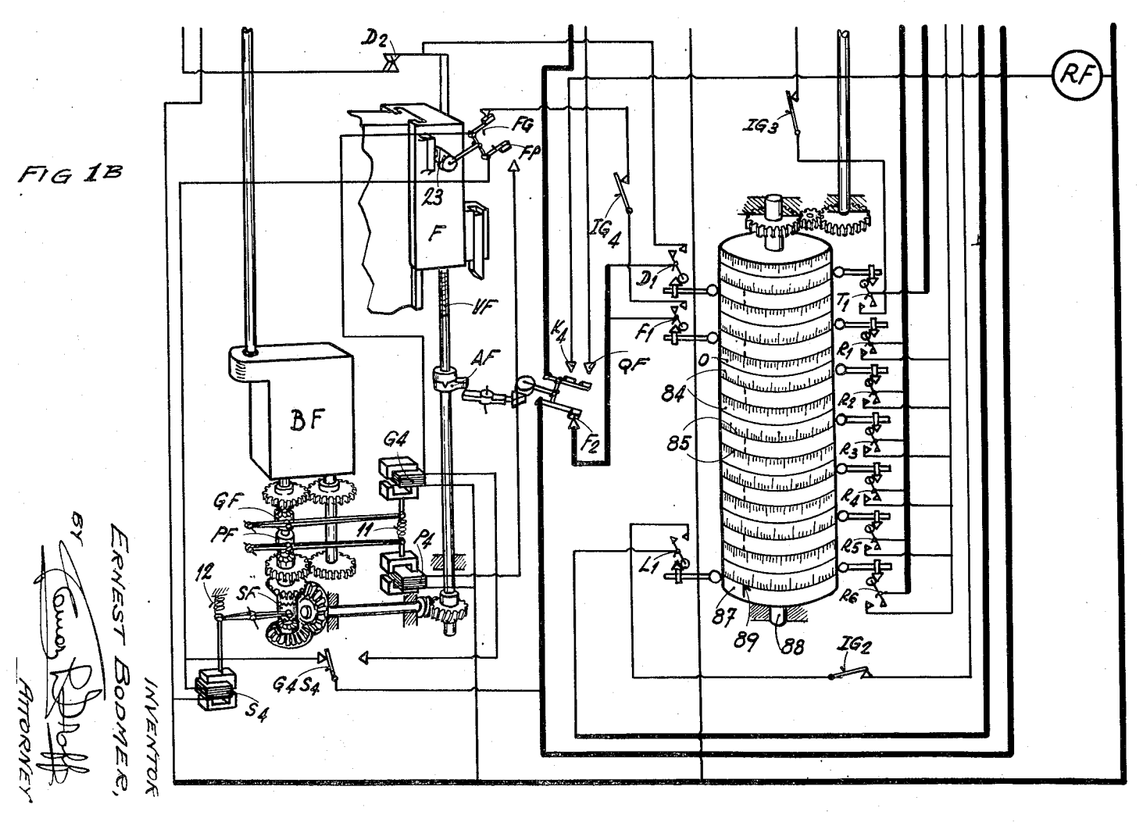

In the form of execution shown in Fig. 1, the control members consist of lead screws, the connecting members of couplings, and the source of energy of an electric motor.

The couplings are set into the active position by an electro-mechanical control device.

The automatic lathe shown by way of example comprises:

(a) A turret R at the end, with horizontal axis, of the polygonal drum type described in my Patent No. 2,464,844, granted March 22, 1949; in consequence, this turret will not be described here in detail. In principle, such a turret comprises a toolholder slide C mounted on each face of the drum. Each slide C is rigidly connected to an auxiliary slide 1 on whose outer face is mounted an actuating member 2, whose position can be adjusted. These actuating members are displaced successively by a control member constituted by a lead screw VR. This screw carries a nut 3 bearing a finger (not shown) intended to engage with the actuating member 2 carried by the auxiliary slide 1 rigidly connected to the toolholder slide C which is in the angular working position. The nut 3 carries also two fingers 4 and 5. The finger 4 causes—as described in my above-mentioned Patent No. 2,464,844—the indexing of the turret when the actuated toolholder slide C has returned to its position of rest after a working stroke. At the end of the working stroke, the finger 5 causes, as described above, the actuated slide C to stop, the direction of rotation of the lead screw VR to be reversed, and the latter then finally to be stopped rotating when the nut 3 has returned to its initial position.

The lead screw VR is actuated by a motor M and by means of a train of transmission members comprising: a speed change device BR, a coupling GR and a coupling PR, a device SR for reversing the direction of rotation, and a safety device AR limiting the torque that can be transmitted.

(b) A lateral toolholder L having an upper longitudinal slide LL and a lower transverse slide LT. This lateral toolholder is mounted on a support 6 rigidly connected to the frame of the lathe by any known means (not shown, for the sake of clearness of the drawing). Each slide LL, LT of this toolholder is actuated by an individual control member consisting of a lead screw VL and VT respectively. These latter are each connected to the motor M by a train of transmission members comprising: (1) a speed change device BL and BT respectively; (2) a coupling GL and GT respectively and a coupling PL and PT respectively; (3) a device SL and SR respectively, for reversing the direction of rotation of the lead screw; (4) a safety coupling AL and AT respectively limiting the torque that can be transmitted.

(c) A radial toolholder F with a single toolholder slide actuated by a lead screw VF. This latter is also mechanically connected to the motor M by means of a train of transmission members comprising: (1) a speed change device BF; (2) a coupling GF and a coupling PF; (3) a device SF for reversing the direction of rotation of the lead screw VF; (4) a safety coupling AF limiting the torque that can be transmitted.

(d) A feed device of the spindle B comprising: (1) a device A of known type for advancing the bar, its movements being controlled by a cam CA; (2) a clamping device S of known type, its movements being controlled by a cam CS.

The cams CA and CS are mounted on one and the same auxiliary shaft V mechanically connected to the motor M by a train of transmission members comprising a coupling N.

(e) A distributor O intended to cause, by orders issued at the desired moments, the individual setting into action of each of the control members VR, VL, VT, VF of the lathe as well as the auxiliary shaft V. This distributor is continuously driven by the motor M. In the form of execution shown, this distributor is assumed to be of the type of the one described in my Patent No. 2,469,761, granted May 10, 1949, but it is clear that any other known distributor device (electric, hydraulic, pneumatic or mechanical) capable of issuing orders at exactly determined instants, could be used.

The distributor shown comprises a rotary member, having discs 84 carrying a graduated scale 85 and angularly adjustable with respect to marks 89 made on the parts 87 rigidly connected to an operating shaft 88. Locking means (not shown) allow the discs to be held rigidly with respect to the parts 87 in any desired angular position.

Each disc 84 is provided with means (not shown) intended to actuate a contact $R_1$ to $R_6$, $D_1$, $L_1$, $T_1$, $F_1$. The contacts $R_1$ to $R_6$ are arranged in parallel and are fitted in the circuit leading current to an electromagnet $G_1$ and switch it on and off. The other contacts $D_1$, $L_1$, $T_1$, $F_1$ are each fitted in the circuit energising one of the four electromagnets $G_2$, $G_3$, $G_4$, D and switch each of them on and off individually. One of the couplings mentioned GR, GL, GT, GF, N is allocated to each electromagnet $G_1$ to $G_4$ and D, and it controls the individual movements of engaging and disengaging of its driving and driven parts.

The engaging and disengaging movements of the safety couplings AR, AL, AT, AF are not caused by electromagnets, but by the couple to be transmitted acting against the force of a spring (not shown) tending to keep the two parts engaged. This type of coupling being well known and commonly adopted in the majority of existing lathes, will not be described here.

The movements of each of the other couplings fitted in the mechanical connections uniting each lead screw VR, VL, VT, VF to the motor M are controlled by an individual electromagnet $P_1$ to $P_4$ and $S_1$ to $S_4$, which is caused to be switched on and off by the movements of the member controlled by the lead screw in question, this lead screw being set into action by the closing of the corresponding contact $R_1$ to $R_6$, $D_1$, $L_1$, $T_1$, $F_1$.

Thus, the control device of each lead screw comprises three electromagnets having the following functions:

(1) Each electromagnet $G_1$ to $G_4$ controls, against the force of a spring 11, the engagement of the driving and driven parts of one of the couplings GR, GL, GT, GF causing the rotation at high speed of the lead screw VR, VL, VT, VF which is attributed to it.

(2) Each electromagnet $P_1$ to $P_4$ controls, against the force of one of the springs 11, the engagement of the driving and driven parts of one of the couplings PR, PL, PT, PF causing the rotation at slow speed of the lead screw VR, VL, VT, VF which is allocated to it. This speed is different for each control member and is a function of the kind of machining which has to be performed by the tool carried by the displaced slide. This speed is determined by the position occupied by the different members of the speed change device connecting the lead screw in question to the motor M. The setting into position of the members of the speed change device is effected when setting the lathe before starting to machine a series of pieces.

With regard to the speed change device BR, it comprises several sliding members (not shown), whose movements are controlled by the operating members OM. The latter are actuated, at the time of indexing of the turret, by catches 81 mounted and adjustable in position on a drum rigidly connected to the turret as described in my Patent No. 2,464,845, granted March 22, 1949.

(3) Each electromagnet $S_1$ to $S_4$ controls, against the force of springs 12, the displacements of the moving part of one of the couplings SR, SL, ST, SF. Each of these latter consists of a double coupling in which the displacements of the movable part cause the lead screw which it actuates, to rotate in one direction or in the other. For this purpose, each of these couplings have one movable part and two parts each fixed rigidly to a bevel wheel 13, 14, fixed either on a shaft controlling by positive drive one of the lead screws VR, VL, VT, or driven by positive drive by the speed change device BF. A third bevel wheel 15 rigidly connected to a shaft driven either by one of the speed change devices BR, BL, BT, or driving by positive drive one of the lead screws VF is in mesh with each of the two bevel wheels 13, 14. It is clear that, according as the movable part of one of the double couplings is engaged with the part rigidly fixed to the wheel 13 or with the part rigidly fixed to the wheel 14, the lead screw which it actuates will be driven in one direction of rotation or in the other. The springs 12 tend to keep the movable part of the double couplings in mesh with the part rigidly connected to the wheel 13 which actuates the lead screw allocated to it, causing the screw to rotate in its normal direction for the execution of a working stroke of the slide which it controls.

(4) The electromagnet D causes the driving and driven parts of the coupling N to engage and the setting into rotation of the auxiliary camshaft V which controls the bar-advancing device A and the clamping device S. The control of the two last devices is completely finished after one complete revolution of the auxiliary shaft V. The stopping of the latter is caused by the disengagement of the two parts of its operating coupling N. This disengagement is caused by a known device which is commonly used in known types of lathes to drive such auxiliary camshafts.

All the electric circuits of the lathe are fed from supply mains W and by means of a main switch IG.

The motor M is connected to the three phases of the supply mains, the control and safety circuits to two phases of the mains.

The circuits energizing the electromagnets have several switches and reversers actuated by the movements of the tool-holder slides, of their control members and of the safety couplings.

The main switch IG is operated by hand, but it may be caused to open by the energizing of a safety electromagnet Q, connected ahead of the main switch and which energising circuit is controlled by the contacts QR, QL, QT, QF, connected in parallel to each other. The closing of one of these contacts causes the lathe to stop and is controlled by the movements of one of the safety couplings. Thus the closing of the contact QR is controlled by the disengagement of the parts of the coupling AR, and so on. Finally, a contact QA is provided, whose closing is controlled by the bar-advancing device A when the bar being machined has been finished. The closing of this contact also causes the electromagnet Q to be energised and the lathe to be stopped automatically.

Simultaneously with the closing of QR, QL, QT, QF, the movements of the safety couplings cause the closing of a contact $K_1$, $K_2$, $K_3$, $K_4$, causing the closing of the feed circuit of one of the four alarm signals KR, KL, KT, KF. A fifth alarm signal, KA, is set in action when the bar being machined is finished, by the closing of a contact $K_5$ actuated by the bar-advancing device A.

Finally, the movements of disengagement of the two parts of the couplings AR, AL, AT, AF, cause respectively the opening of one of four contacts $R_7$, $L_2$, $T_2$, $F_2$, connected in series with respect to one another and each of them in series in the energising circuit of one of the electromagnets $G_1$, $G_2$, $G_3$, $G_4$ ahead of the contact controlled by the distributor O.

It follows, that when the torque to be transmitted to any one of the lead screws exceeds a value determined in advance, the two parts of its safety coupling disengage from each other causing:

(1) The lathe to stop, by closing the energising circuit of the electromagnet Q which causes the main switch IG to open;

(2) The setting into action of the alarm signal KL, KR, KT, KP allocated to the safety coupling which has functioned;

(3) The interrupting of the energising circuit of the electromagnets $G_1$, $G_2$, $G_3$, $G_4$ controlling the setting into action of the lead screw actuated by the safety coupling which has functioned.

The contact $D_1$ being connected after all the contacts $R_7$, $L_2$, $T_2$, $F_2$, the energising circuit of the electromagnet D which causes the auxiliary camshaft V to be set in action, can only be put under voltage if all these contacts are closed, that is to say if the lathe is working normally.

Each toolholder slide in the course of its movements actuates a bipolar switch by means of a finger 20, 21, 22, 23, whose position along the said slides can be adjusted. One of the contacts RG, LG, TG, FG, of this switch is connected in series in the energising circuit of the corresponding electromagnet $G_1$, $G_2$, $G_3$, $G_4$, and ahead of the contact controlled by the distributor O. The second contact RP, LP, TP, FP, is connected to the energising circuit of the corresponding electromagnet $P_1$, $P_2$, $P_3$, $P_4$. The operating of this switch by one of the slides during its outward stroke causes:

(1) Putting out of circuit the corresponding electromagnet $G_1$, $G_2$, $G_3$, $G_4$;

(2) Putting under voltage the corresponding electromagnet $P_1$, $P_2$, $P_3$, $P_4$.

It follows that the corresponding control member, actuated at high speed by means of one of the couplings GR, GL, GT, GF, is now actuated at the working speed by means of one of the couplings PR, PL, PT, PF.

Finally, the automatic lathe is fitted with reversing switches, each operated by one of the nuts mounted on the lead screws. These reversing switches are operated in one sense at the end of the working stroke and in the other sense at the end of the return stroke.

Of the four reversing switches fitted in the lathe shown in the drawing, only the switch IR operated by the nut 3 and included in the circuits of the control devices of the lathe, is illustrated diagrammatically with its operating members. The others, IL, IT and IF being in all respects similar to IR are, for the sake of clearness in the drawing, noted only as a reminder and without their operating members.

Each of these reversing switches comprises a switch $IG_1$, $IG_2$, $IG_3$, $IG_4$ and a reverser $G_1S_1$, $G_2S_2$, $G_3S_3$, $G_4S_4$.

The switches $IG_1$, $IG_2$, $IG_3$, $IG_4$ are each connected in series in the circuit of the corresponding electromagnet $G_1$, $G_2$, $G_3$, $G_4$ after the contact RG, LG, TG, FG but ahead of the contact controlled by the distributor O.

The reversers are connected after each of the respective safety switches and lead current: (a) in one of their positions to the corresponding contact RP, LP, TP, FP and the corresponding electromagnet $S_1$, $S_2$, $S_3$, $S_4$; (b) in their other position to the corresponding electromagnet $G_1$, $G_2$, $G_3$, $G_4$.

Finally, contacts $D_2$ and $D_3$ are connected in series in the energising circuit of the electromagnet D. The contact $D_2$ is controlled by the displacements of the tool-slide F in a manner to prevent electrical energization of the electromagnet D as long as this slide is out of its rest position, that is, the position shown in the drawing. The contact $D_3$ is controlled by a cam $D_4$ causing the energising circuit of the electromagnet D to the opened after the auxiliary shaft V has turned through about 45 to 90°.

The described automatic lathe works as follows:

A. *Starting*

All the toolholder slides and also the devices for feeding bar to the spindle being in their position of rest (the position shown in the drawing), closing of the main switch IG causes:

(1) The motor M, which keeps the distributor O rotating, to be switched on;

(2) The setting under voltage, by means of the safety switches $R_7$, $L_2$, $T_2$, $F_2$, of one of the poles of each switch $R_1$ to $R_6$, $L_1$, $T_1$, $F_1$, $D_1$ controlled by the distributor;

(3) The energising of the electromagnets $S_1$, $S_2$, $S_3$, $S_4$, by the reversers $G_1S_1$, $G_2S_2$, $G_3S_3$, $G_4S_4$. The movable parts of the double couplings SR, SL, ST, SF are thus engaged with their fixed parts rigidly connected to the wheel 13, making the lead screws VR, VL, VT, VF rotate in their normal working direction.

B. *Individual setting into action of the control members*

The distributor being kept rotating, it controls at moments fixed in advance by the adjusted angular position of its discs 84, the closing of the contacts $R_1$ to $R_6$, $L_1$, $T_1$, $F_1$, $D_1$. Each of these contacts causes the individual energising of one of the electro-magnets $G_1$, $G_2$, $G_3$, $G_4$, D by $IG_1$, RG—$IG_2$, IG—$IG_3$, TG—$IG_4$, FG—$D_2$, $D_3$ and each of these electromagnets causes the engagement of the coupling GR, GL, GT, GF, D which is allocated to it, and thus sets into individual action at high speed each lead screw controlling the movements of the toolholder slides, as well as the setting into individual action of the auxiliary camshaft V controlling the barfeed devices A and S of the spindle B.

C. *Movement of each toolholder slide at the predetermined speed*

A little before reaching its working position (at which the tool fixed on it comes into contact with the piece being machined), each slide operates, by the intermediary of the finger 20, 21, 22, 23 which it carries, the switches RG, RP—LG, LP—TG, TP—FG, FP which are allocated to them. The operating of these switches causes:

(1) The cutting out of circuit of the electromagnet $G_1$, $G_2$, $G_3$, $G_4$ controlling the coupling GR, GL, GT, GF driving at high speed the lead screw of the toolholder slide in question and thus the disengagement of the two parts of the said coupling;

(2) The energising of the electromagnet $P_1$, $P_2$, $P_3$, $P_4$ controlling the engagement of the two parts of the coupling PR, PL, PF, PT, driving the lead screw of the toolholder slide in question at a speed of rotation determined by the position of the members of the speed change device BR, BL, BT, BF and chosen in order to obtain the desired advance for the said slide per revolution of the spindle.

From this moment, the toolholder slide C, LL, LT, F in question is thus displaced at a speed corresponding to the speed most suitable for the work which the tool carried by it, has to perform.

D. *Return to the initial position*

At the end of the working stroke, the finger 5 which is carried by each of the nuts 3 mounted on the lead screws VR, VL, VT, VF operates, by means of a system of rods (of which only one is shown), the corresponding reversing switch IR, IL, IT, IF. The operating of this switch causes:

(1) The opening of the corresponding switch $IG_1$, $IG_2$, $IG_3$, $IG_4$, so that the energising circuit of the electromagnet $P_1$, $P_2$, $P_3$, $P_4$, in which the switch is inserted, is cut at two places, i. e. by this switch and by the corresponding contact RG, LG, TG, FG;

(2) The reversing of the corresponding contact $G_1S_1$, $G_2S_2$, $G_3S_3$, $G_4S_4$ which causes: (a) the cutting out of the corresponding electromagnet $P_1$, $P_2$, $P_3$, $P_4$, the disengagement, under the force of the spring 11, of the parts of the coupling PR, PL, PT, PF which it controls, and thus the stopping of the operating of the lead screw controlling the slide in question; (b) the cutting out of the corresponding electromagnet $S_1$, $S_2$, $S_3$, $S_4$ and thus the reversing of the double coupling SR, SL, ST, SF controlled by this electromagnet. Under the force of the spring 12, the movable part of this coupling comes into engagement with the part rigidly connected to the bevel wheel 14 driving in the reversed direction the lead screw controlling the toolholder slide in question; (c) the energising of the corresponding electromagnet $G_1$, $G_2$, $G_3$, $G_4$ and the engagement of the coupling GR, GL, GT, GF controlled by it.

It follows that the lead screw controlling the toolholder slide in question is now operated in the opposite direction and at high speed, so that the said slide is moved at high speed in the direction of its position of rest.

During the return stroke of the toolholder slide C, LL, LT, F in question, its finger 20, 21, 22, 23 operates the switches RP, RG—LP, LG—TP, TG—FP, FG which return into the position shown in the drawing and cause:

(1) By opening the contact RP, LP, TP, FP in question a second break in the energising circuit of the electromagnet $P_1$, $P_2$, $P_3$, $P_4$ in which it is inserted;

(2) The closing of the contact RG, LG, TG, FG in question. This closing however, does not always have any effective result, since the energising circuit of the electromagnet in which it is connected is already open by the reverser $G_1S_1$, $G_2S_2$, $G_3S_3$, $G_4S_4$ connected in series with it.

E. *Stopping the control member*

Finally, after return of the slide in question to the position of rest, the finger of the nut 3 which actuates it, is disengaged from its guide 2, then the finger 5 actuates the corresponding reversing switch. The latter returns into its initial position (the position shown in the drawing), and for which:

(1) The corresponding switch $IG_1$, $IG_2$, $IG_3$, $IG_4$ is closed, so that the energising circuit of the electromagnet $G_1$, $G_2$, $G_3$, $G_4$ in which it is inserted is ready to receive a new impulse of current by the closing of its control contact $R_1$ to $R_6$, $L_1$, $T_1$, $D_1$, $F_1$ actuated by the distributor;

(2) The corresponding reverser $G_1S_1$, $G_2S_2$, $G_3S_3$, $G_4S_4$ has opened the energising circuit of the electromagnet $G_1$, $G_2$, $G_3$, $G_4$, so that the lead screw controlling the slide under consideration is stopped;

(3) This reverser $G_1S_1$, $G_2S_2$, $G_3S_3$, $G_4S_4$ now leads current to: (a) the electromagnet $S_1$, $S_2$, $S_3$, $S_4$ whose energising circuit it controls and which causes reversal of the double coupling SR, SL, ST, SF driving the lead screw of the slide in question. This coupling is then again in the position shown in the drawing where the lead screw which it drives is actuated in the normal direction to control the working stroke of the slide in question; (b) one of the poles of the contact RP, LP, TP, FG whose closing is controlled by the movements of the toolholder slide in question.

It follows that, when the distributor will cause a new closing of the control contact $R_1$ to $R_6$, $L_1$, $T_1$, $F_1$ of the energising circuit of the electromagnet causing the setting into action of the lead screw controlling the said toolholder slide, this latter will be actuated at high speed in the direction of the working stroke.

It is to be noted that as soon as the fingers 20, 21, 22, 23 of the actuated slide have caused the opening of the contact RG, LG, TG, FG which is allocated to it, the contact controlling the setting into action of the said slide and actuated by the distributor O can again be opened without any risk. In fact, the energising of the electromagnet causing the actuating of the slide at the working speed is effected from that time directly by the reverser $G_1S_1$, $G_2S_2$, $G_3S_3$, $G_4S_4$ mounted in series in the circuit of the said electromagnet and connected ahead of the contact controlled by the distributor O.

In the same way the premature closing of a contact by the distributor O has no effect, since the feed circuit which it controls, remains opened by RG, LG, TG, FG and $IG_1$, $IG_2$, $IG_3$, $IG_4$ until the slide which it causes to be set in action has returned to its initial position.

Finally, the auxiliary camshaft C cannot be put into action as long as the slide F is outside its position of rest and the contact $D_2$ is open.

Thus each toolholder slide with which the lathe is fitted is actuated independently of the others, that is to say at any desired moment and at the desired speed, and the setting into the active position of its individual connecting member is subject to the position occupied by the said slide.

The control device of the indexing of the turret is described in detail in my above mentioned Patent No. 2,464,845, and will not be described here. The same holds good for the control device of the speed change device BR of the turret.

As described above, if the torque required to actuate a toolholder slide exceeds a certain value, the safety cut-out of the said slide causes the lathe to stop by opening the main switch IG. Further, this cut-out sets in action a specific alarm signal KL, KR, KT, KF allowing the fault to be immediately located.

When the end of the work piece has been reached, the device A which advances the work piece, initiates the closing of the contacts $K_5$ and QA which cause:

(1) Energization of electromagnet Q and then the opening of main circuit breaker IG and the stopping of the lathe;

(2) Actuation of alarm signal KA.

One of the great advantages possessed by the described automatic lathe is, that the individual operations of a cycle of machining operations need not necessarily be grouped in phases of operations. In fact, the distributor O can cause a control member to be set into action at any desired moment, so that the operations can be performed one after the other or certain of them simultaneously whenever all the conditions requisite for their execution have been realised. In the form of execution represented, only the setting into action of the auxiliary shaft V is subject to the position occupied by the toolholder F, this latter being assumed to be the parting toolholder. It is clear that the setting into action of this latter can also be subject to the position of other toolholders in order to prevent its being displaced out of its position of rest as long as all other operations of the cycle of operations have not been finished.

From the preceding it will also be noted, that the idle times for each slide are reduced to a minimum. In fact, each toolholder slide is moved at first at accelerated speed until near a position where the tool which it carries comes into contact with the piece being machined; then it is actuated at the working speed, and finally the return to the position of rest is effected at accelerated speed. Now, as described, in my above mentioned Patents No. 2,469,761 and No. 2,464,845, and as appears clearly on the drawing (see control of the turret toolholder slides), each screw always makes the same number of revolutions as determined by the fingers carried by its nut when coming into contact with the members causing reversal of its direction of rotation and its stopping in the position of rest. In other words, whatever machining has to be effected, the nut carried by the lead screw makes always the same displacement.

On the other hand, the total stroke, the working stroke plus the idle stroke, of each toolholder slide is adjusted to correspond to the stroke which is strictly necessary. That is possible because of the actuating member 2 by whose action each slide C, LL, LT, F is operated. This actuating member can be adjusted with respect to position, and consists of a guide which can pivot on itself. This guide is intended to cooperate with a finger (not shown) carried by each nut. This total stroke being adjusted by the angular position of the said guide, that is to say by the ratio of transmission between a nut and its slide, it is then possible to fix the speed of rotation of the lead screw necessary to obtain the desired displacement of the slide. The speed of rotation of the lead screw is then adjusted by putting into position the members of its speed change device. Because the toolholder slides are controlled by the lead screws, the feed speeds can be chosen as high as desired without any risk of chattering or of displacement by jerks.

From what has been said, it follows that in fact the toolholder slides can be adjusted in such a way as to make no idle movement other than that necessary to lead the tool into the working position and to bring the slide back to its initial position, and that these idle movements may be effected at a very great speed so that the idle times become practically negligible.

The regulating of the described automatic lathe is extremely simple, since after adjusting the stroke and the speed of displacement of each slide, it is sufficient to fix the discs 84 of the distributor in angular position with respect to each other so as to cause the departure of each slide in accordance with the succession of the desired operations and at the intervals of time exactly sufficient to avoid collision between two members of the lathe. Thus if the graduated scales 85 carried by the discs 84 are divided in units equal to one-tenth of a complete revolution of the shaft 88, this latter making one complete revolution during one complete machining operation, it is understood at once that each division of these scales may represent one-hundredth of the time necessary for the complete cycle of operations. But, knowing the actual duration of each individual operation and also of the complete cycle, it is an extremely easy matter to express these individual times in hundredths of the duration of a cycle, that is to say, of a revolution of the shaft 88.

Figure 2:
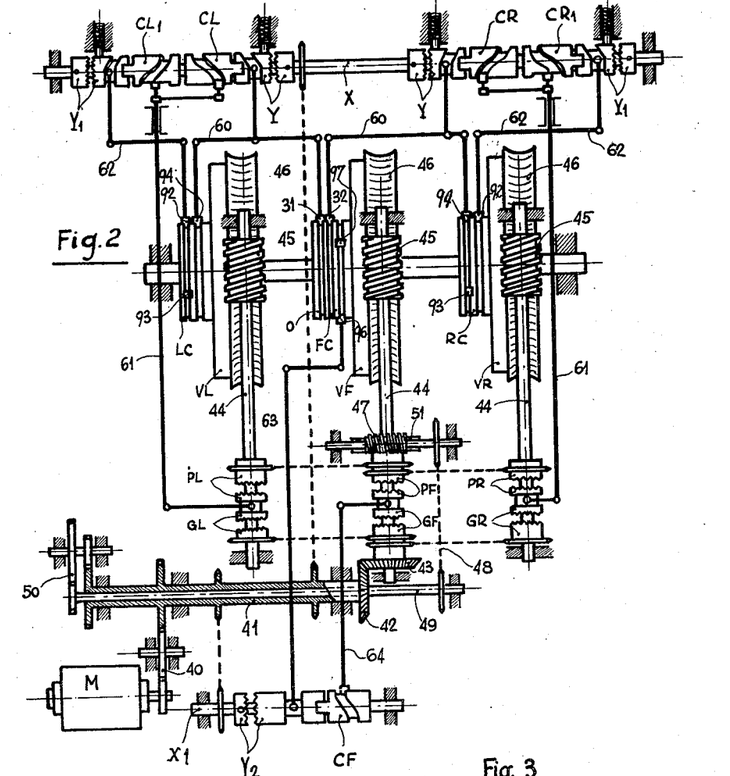
Fig. 2 shows, diagrammatically, a part of the scheme of the arrangement of the mechanical connections in a second form of execution.
Figure 3:
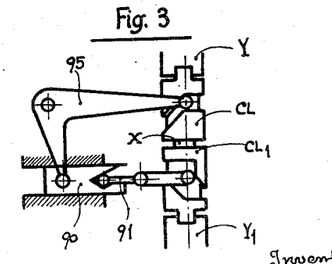
Figure 3 is a detail view of the lever means for operating the sliding block which operates the rod for controlling engagement of the driving and driven parts of the coupling with which the rod is associated.
Figure 4:
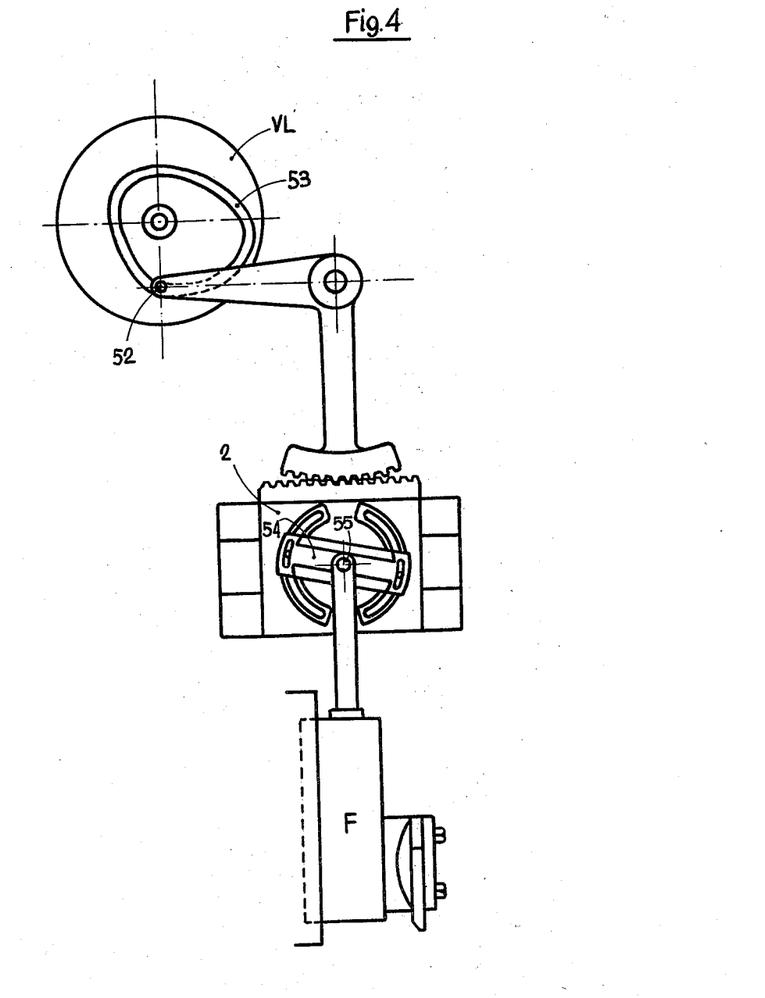
Figure 4 is a detail view of the operating means for a tool holder carriage.

In the form of execution shown in Figs. 2 to 4, the automatic lathe is provided with mechanical control devices for the connecting members which join the control members of the slides and the feed devices of the spindle to a source of energy constituted by the motor M.

In these figures, only the members necessary for proper understanding of the working of the lathe are shown.

In this form of embodiment, the lathe comprises:

(a) A distributor O consisting of discs, each of them having a notch, into which the catches can slide and be fixed in any desired relative angular position;

(b) Control members VR, VL, VF consisting of camshafts. Only one of these cams is shown in profile in Fig. 4;

(c) Actuating members 2 (Fig. 4) with adjustable ratio of transmission, inserted in each train of transmission members connecting a slide to its control cam;

(d) Connecting members GR, PR—GL, PL—GF, PF connecting the control members to the motor M. The connecting members consist of couplings;

(e) Devices mechanically controlling the movements of the said couplings.

Each control member VF, VR, VL is rigidly connected to a toothed wheel 46 in mesh with a worm 45 rigidly connected to a shaft 44. Each of these latter carry the driven movable parts of two couplings GR, PR—GL, PL—GF, PF. The corresponding driving parts of these couplings are mounted loose on the said shafts 44. The driving parts of the couplings GR, GL, GF are driven at high speed by the motor M, and by means of a train of transmission members comprising:

(a) A pair of bevel wheels 42, 43;
(b) A hollow shaft 41;
(c) A train of interchangeable gears 40.

The driving parts of the couplings PR, PL, PF are driven at reduced speed by the motor M and by means of a train of transmission members comprising:

(a) A toothed wheel 51 in mesh with a worm 47;
(b) A chain gear 48 connecting the worm 47 to a shaft 49;
(c) A train of interchangeable gears 50 connecting the shaft 49 to the hollow shaft 41.

The mechanical devices controlling the displacements of the movable parts of the couplings GR, PR—GL, PL—GF, PF comprise:

(a) Shafts X and $X_1$ continuously driven by the motor M;
(b) Couplings Y and $Y_1$ whose driving parts are rigidly connected to the shaft X;
(c) Cams CR, CL, driven by the driven parts of the couplings Y;
(d) Cams $CL_1$, $CR_1$ driven by the driven parts of the couplings $Y_1$;
(e) A coupling $Y_2$ whose driving part is rigidly connected to the shaft $X_1$;
(f) A cam CF driven by the driven part of the coupling $Y_2$;
(g) Cams RC and LC driven by positive drive by the control members VR and VL;
(h) Systems of rods 60 actuated by the distributor O on the one hand and by the cams RC and LC on the other and acting on the movable parts of the couplings Y;
(i) A cam FC rigidly connected to the distributor;
(j) The several rods 61 actuated by cams CR, $CR_1$ and $CL_1$, CL, which are caused to move by the couplings Y. These rods 61 cause the displacements of the movable parts of the couplings GR—PR, GF—PF, GL—PI, which are connected to them;
(k) Systems of rods 62 actuated by the cams RC, LC and causing the displacements of the movable parts of the couplings $Y_1$, $Y_1$;
(l) A system of rods 63 actuated by the cam FC and causing the displacements of the coupling $Y_2$.

The control members VR, VF, VL each consist of a cam with a groove 53 (Fig. 4) with which a finger 52 co-operates. Each finger 52 is connected to one of the slides C, LL, LT, F with which the lathe is fitted, by means of a train of transmission members having an actuating member of adjustable position allowing the amount of displacement of the slide in question to be chosen and fixed. This actuating member consists of a guide 54 with which a finger 55 co-operates. This guide 54 may be placed in any desired angular position.

The functioning of this form of execution of the lathe is in all respects similar to that described above and can be at once deduced from the drawing.

A. *Starting the lathe*

All the toolholder slides being in the starting position, and the angular positions of the catches being adjusted according to the cycle of operations, the motor M is started. This then drives the cam VF and the distributor O at reduced speed by means of the coupling PF. The cam VF actuates its toolholder slide F while turning at reduced speed, that is to say at the predetermined speed to obtain the desired speed of advance of the slide.

This slide being the slide for the parting tool, it is clear that the groove 53 is circular over all the first part of the rotation of the cam, since it only actuates its toolholder F at the end of the cycle of operations.

B. *Putting the control members into action*

The catches 31, 32 of the distributor O cause, at the desired moments and by means of the system of rods 60, the individual engagement of each coupling Y. These latter drive the cams CR, CL which cause the individual engagement of the couplings GR, GL and thus the individual driving at high speed of the control members VR, VL.

In fact, when the cam CL for example is driven, it actuates a sliding block 90 (Fig. 3) by means of the lever 95. The displacement of this block 90 frees a rod 91 which, under the force of a spring (not shown), acts on the rod 61 and causes engagement of the driving and driven parts of the coupling GL.

C. *Control of each slide at the working speed*

When the toolholder slide controlled by one of these members VR, VL arrives in the working position, catches 92 placed on the cams RC, LC cause individual engagement of the couplings $Y_1$. Each of these latter drives its cam $CL_1$ which causes, by 91 and 61:

(a) Disengagement of the corresponding coupling GR, GL;
(b) The driving at reduced speed of the control member VR, VL in question.

D. *Quick return to the initial position*

When the actuated toolholder slide arrives at the end of the working stroke, a catch 93 mounted on the corresponding cam RC, LC causes, by means of the rod 62, the engagement of the corresponding coupling $Y_1$. This latter drives $CL_1$ which causes, by action of 91 and 61:

(a) Disengagement of the corresponding coupling PR, PL;
(b) Engagement of the corresponding coupling GR, GL and thus the driving at accelerated speed of the control members VR, VL while these move their slides in the direction of the initial position of the latter.

E. *Individual stopping of the control members*

Finally, when the toolholder slides arrive in the position of rest, the catches 94 mounted on the cams RC, LC cause by action of member 89 the engagement of the corresponding coupling Y and thus the driving of CR, CL. These cams then cause member 91 to be locked in the position shown in Fig. 3, where the driven parts of the couplings GL, PL—GR, PR are out of engagement with their driving parts.

At the end of the cycle of operations, the control member VF actuates its toolholder F and when the latter has returned to its initial position, a catch 96 mounted on the cam FC causes, by means of the system of rods 63, the engagement of the coupling $Y_2$. This latter drives the cam CF which causes, by a rod 64, disengagement of the coupling PF and engagement of the coupling GF. The slide F is thus led back at high speed until it comes into its starting position. When it arrives in this latter position, a second catch 97, mounted on the cam FC, causes the disengagement of $Y_2$ and the stopping of CF. Nevertheless, this cam having then performed a complete revolution, GF is disengaged and PF engaged driving the distributor again at reduced speed. When tool holder F arrives in the starting position, the cycle is finished and the distributor has performed one complete revolution and the lathe recommences a cycle of operations. During the latter part of the rotation of the distributor O, a cam (not shown) of this latter causes the auxiliary shaft V (not shown) to be driven. This latter carries the cams which actuate the bar-feeding devices A and clamping jaw S of the spindle B (not shown).

It will be noted that the cams IC, RC and the distributor O always cause the engaging movements of the couplings Y and $Y_1$. The disengagement of the driving and driven parts of these couplings is caused, after each half-revolution of the cams which they drive, by a known device as generally used on all automatic lathes to control the driving couplings of the auxiliary camshafts.

From what has been said above and from a study of the accompanying drawing, it will be seen that the two described forms of execution are similar and make use of the same method of control; only the control devices and the control members used to put the method into practice are different.

The lathe as described can be equipped with toolholder carriers other than those described, it being possible to actuate the slides of each of these latter by control members set each into action individually by individual connecting members, which are set individually in active position by the orders issued by the distributor.

In the first form of execution described, each of the n control members of the lathe is individually connected to the source of energy by a connecting member, and each of the latter is set individually into the active position by the orders issued by the distributor.

In the second form of execution, one of the control members is rigidly connected to the distributor, so that only n—1 control members are connected to the source of energy by an individual connecting member.

It is evident that only the control members of the toolholder slides are to be considered here as control members. The auxiliary shaft V, which must be subject to the position of the parting-toolholder could very well be set in action by the displacements of this toolholder, when it arrives in its initial position.

The control devices of the driving members can be either electro-magnetic as described in the form of execution shown in Fig. 1, or mechanical as shown in Figs. 2 to 4, or even hydraulic or pneumatic. In this last case, the electromagnets actuating the different couplings are replaced by servomotors, while the switches and reversers are replaced by slide valves connected on one hand to a fluid source, and on the other hand to the said servomotors, and controlling the admission of fluid under pressure to the said servomotors and their connection to discharge. The distributor can also consist of a fluid distributor causing each of the slide valves to be set into individual active position at the desired moments.

Finally, the source of mechanical energy consisting of a motor may also consist of an electric source or a source of fluid under pressure. In this case, the control members can consist of electric motors (Leonard sets) or servomotors, while the connecting members may consist of cut-outs, contactors, switches or other electric apparatus, or finally a slide valve connecting the control member to the source of energy.

I claim:

1. An automatic lathe having a turret, toolholder slides mounted on said turret, a lead screw, an elongated nut mounted on said screw, means connected with each slide for selective engagement with said nut, a motor for rotating said screw, a transmission train between said motor and said screw including a device for reversing the direction of rotation of the screw and a device for changing the speed of rotation of the screw, said reversing device having a shiftable operator whose placement in one position causes the motor to rotate the lead screw in one direction and whose placement in another direction causes the motor to rotate the lead screw in the opposite direction, a finger carried by said nut, and means actuated by said finger for shifting said operator and for actuating said speed changing coupling.

2. An automatic lathe having a turret, toolholder slides mounted on said turret, a lead screw, an elongated nut mounted on said screw, means connected with each slide for selective engagement with said nut, a motor for rotating said screw, a transmission train between said motor and said screw including a device for reversing the direction of rotation of the screw and a device for changing the speed of rotation of the screw, said reversing device having a shiftable operator whose placement in one position causes the motor to rotate the lead screw in one direction and whose placement in another direction causes the motor to rotate the lead screw in the opposite direction, a finger carried by said nut, and means actuated by said finger for shifting said operator and for actuating said speed changing coupling, said train also including means for limiting the magnitude of torque delivered to the screw.

3. An automatic lathe having a turret, toolholder slides mounted on said turret, a lead screw, an elongated nut mounted on said screw, means connected with each slide for selective engagement with said nut, a motor for rotating said screw, a transmission train between said motor and said screw including a device for reversing the direction of rotation of the screw and a device for changing the speed of rotation of the screw, said reversing device having a shiftable operator whose placement in one position causes the motor to rotate the lead screw in one direction and whose placement in another direction causes the motor to rotate the lead screw in the opposite direction, electromagnetic means for actuating said operator, means for imparting electrical impulses to said electromagnetic means, a control switch for said electromagnetic means, a movable member for actuating said switch and a finger carried by said nut for moving said member.

ERNEST BODMER.

REFERENCES CITED

The following references are of record in the file of this patent:

UNITED STATES PATENTS

| Number | Name | Date |
|---|---|---|
| 725,438 | Gridley | Apr. 14, 1903 |
| 1,810,227 | Shea | June 16, 1931 |
| 2,029,335 | Oberhoffken et al. | Feb. 4, 1936 |
| 2,090,262 | Montgomery et al. | Aug. 17, 1937 |
| 2,118,021 | Curtis | May 17, 1938 |
| 2,255,739 | Curtis | Sept. 9, 1941 |
| 2,289,957 | Godfriaux | July 14, 1942 |
| 2,330,859 | Bench et al. | Oct. 5, 1943 |
| 2,352,183 | Bullard | June 27, 1944 |
| 2,384,809 | Ballard et al. | Sept. 18, 1945 |
| 2,392,074 | Wasson | Jan. 1, 1946 |
| 2,425,308 | Drissner et al. | Aug. 12, 1947 |
| 2,427,493 | Bullard | Sept. 16, 1947 |